UNITED STATES PATENT OFFICE.

JAMES E. MALLORY, OF NEW YORK, N. Y.

IMPROVEMENT IN THE PREPARATION OF FIBER FOR THE MANUFACTURE OF PAPER.

Specification forming part of Letters Patent No. 31,814, dated March 26, 1861.

*To all whom it may concern:*

Be it known that I, JAMES E. MALLORY, of the city, county, and State of New York, have discovered a new and useful mode of separating the fiber from the pulpy or woody substances of plants which afford sufficient fiber to justify the economical application and utilization in the preparation of fiber for useful purposes while the plants are in a green or growing state, of which the following is a specification.

The nature of my invention consists in the method hereinafter described of separating fiber from all extraneous matter contained in such plants, which fiber, when thus separated, is to be used for the manufacture of paper.

To enable others skilled in the art to use my invention or discovery, I will proceed to describe said process.

I use any plant containing sufficient fiber and of such quality as will pay the expense of separating it from the woody or pulpy parts of the plant. The material or plants is cut while in a green or growing state and while the non-fibrous parts are yet unaltered by desiccation, and before they have hardened or the sap is set in the fiber.

In my process I use nothing but cold water in which I macerate the plant. The time may be from one to three day, which softens the woody or pulpy parts; but I do not allow it to remain under water long enough to produce fermentation. The material is then combed and rubbed out, while under water, at one continuous operation. The process of combing and rubbing may be done with any hand-comb and hand-rubber of any convenient kind; or I may use the machine of G. Sanford, patented February 19, 1861, for the purpose of combing and rubbing out the fiber of plants. I may use either of the above-mentioned ways. I may prefer to separate the fiber, continuing the process, without allowing the material to dry, until all the fiber is combed, rubbed, and washed out. My process is altogether a continuous mechanical operation.

I find, by my process of cutting the plants in a green or growing state and washing out the fiber without allowing any fermentation to take place, I am enabled to get a much whiter fiber than by the usual processes of extracting fiber from plants.

I do not claim or use dew or water rotting processes; nor is heat in any way applied; nor do I use any chemicals to separate the fiber. Mine is a cold process of mechanical treatment under cold water.

Having thus described my process, what I claim is—

The process of separating fiber from fiber-yielding plants, as set forth, consisting of the separate and successive steps of combing, rubbing, and washing the plants in cold water, the whole forming one continuous operation, performed while the fiber is fresh and plant undesiccated, as set forth.

JAS. E. MALLORY.

Witnesses:
GELSTON SANFORD,
S. TOWNSEND CANNON.